United States Patent
Muratov et al.

(10) Patent No.: US 6,680,604 B2
(45) Date of Patent: Jan. 20, 2004

(54) METHODS TO CONTROL THE DROOP WHEN POWERING DUAL MODE PROCESSORS AND ASSOCIATED CIRCUITS

(75) Inventors: Volodymyr A. Muratov, Durham, NC (US); Michael Coletta, Lake Forest, CA (US); Wlodzimerz S. Wiktor, Raleigh, NC (US)

(73) Assignee: Intersil Corporation, Palm Bay, FL (US)

( * ) Notice: Subject to any disclaimer, the term of this patent is extended or adjusted under 35 U.S.C. 154(b) by 201 days.

(21) Appl. No.: 09/791,509

(22) Filed: Feb. 22, 2001

(65) Prior Publication Data

US 2001/0045815 A1 Nov. 29, 2001

Related U.S. Application Data

(60) Provisional application No. 60/192,383, filed on Mar. 27, 2000.

(51) Int. Cl.[7] ............................................. G05F 1/56
(52) U.S. Cl. ......................................... 323/285; 323/283
(58) Field of Search ................................ 323/282, 283, 323/284, 285, 280, 351

(56) References Cited

U.S. PATENT DOCUMENTS

| | | |
|---|---|---|
| 5,489,293 A | 2/1996 | Pless et al. |
| 5,585,749 A | 12/1996 | Pace et al. |
| 5,596,532 A | 1/1997 | Cernea et al. |
| 5,635,773 A | 6/1997 | Stuart |
| 5,744,984 A | 4/1998 | Drapac et al. |
| 5,764,007 A | 6/1998 | Jones |
| 5,945,941 A | 8/1999 | Rich, III et al. |
| 5,973,944 A | 10/1999 | Nork |
| 6,009,000 A | 12/1999 | Siri |
| 6,031,707 A | 2/2000 | Meyer |
| 6,163,494 A | 12/2000 | Nork |
| 6,181,120 B1 * | 1/2001 | Hawkes et al. ............. 323/282 |

* cited by examiner

Primary Examiner—Jessica Han
(74) Attorney, Agent, or Firm—Fogg and Associates, LLC; Scott V. Lundberg

(57) ABSTRACT

A DC/DC converter 100 has a DAC 40 that receives a code associated with desired processor operating voltage and sets the reference voltage on its output 41. The reference voltage ($V_{DAC}$) is boosted by the buffer amplifier 42 to center the droop along the median load. A sensed current signal $I_{CS}$ 22 is proportional to the load current $I_o$ 24 and can be either inductor current, or switch current, or diode (or synchronous switch) current. In all cases it is scaled down by the factor of gain $G_c$. A droop control feedback circuit includes an error amplifier 50. It has two inputs. In one embodiment the gain of the converter is by a signal inversely proportional to the processor clock frequency $F_{CPU\,max}$ and transformed to the current $I_{DROOP}$ 32 that creates the voltage drop across the resistor R1. The other input is coupled to the buffer amplifier output. As a result, the output voltage of the converter 50 is inversely proportionally to the load current and is invariant to the processor clock frequency changes associated with the processor mode switchover. Other embodiments modify the gain of the error amplifier, or offset the gain and hold the amount of droop constant.

34 Claims, 9 Drawing Sheets

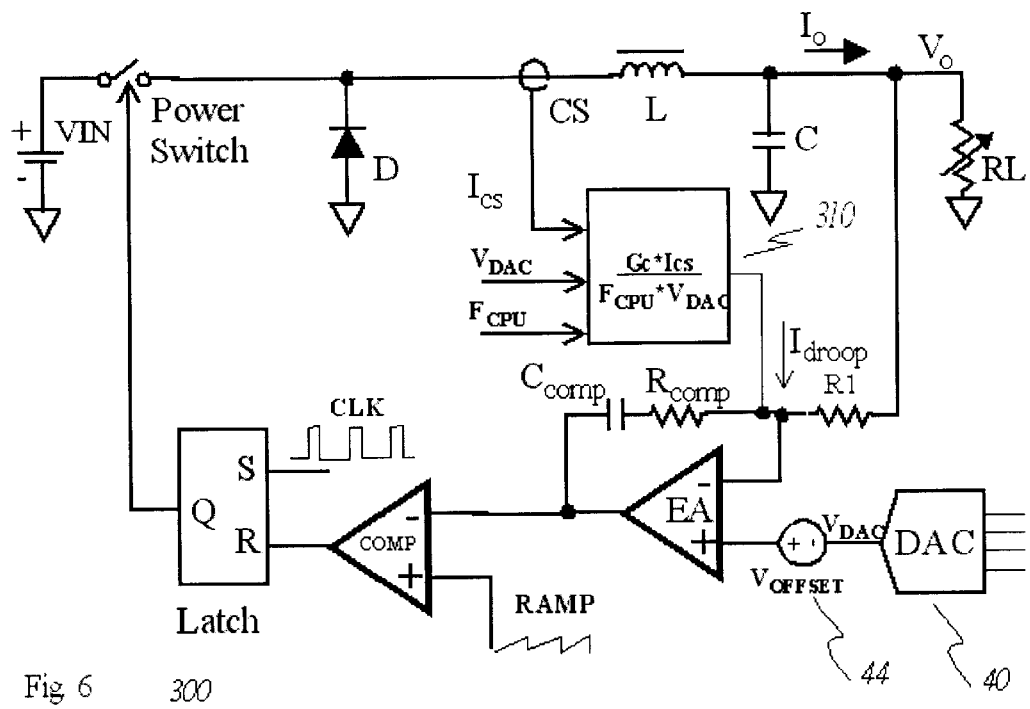
Fig. 6    300
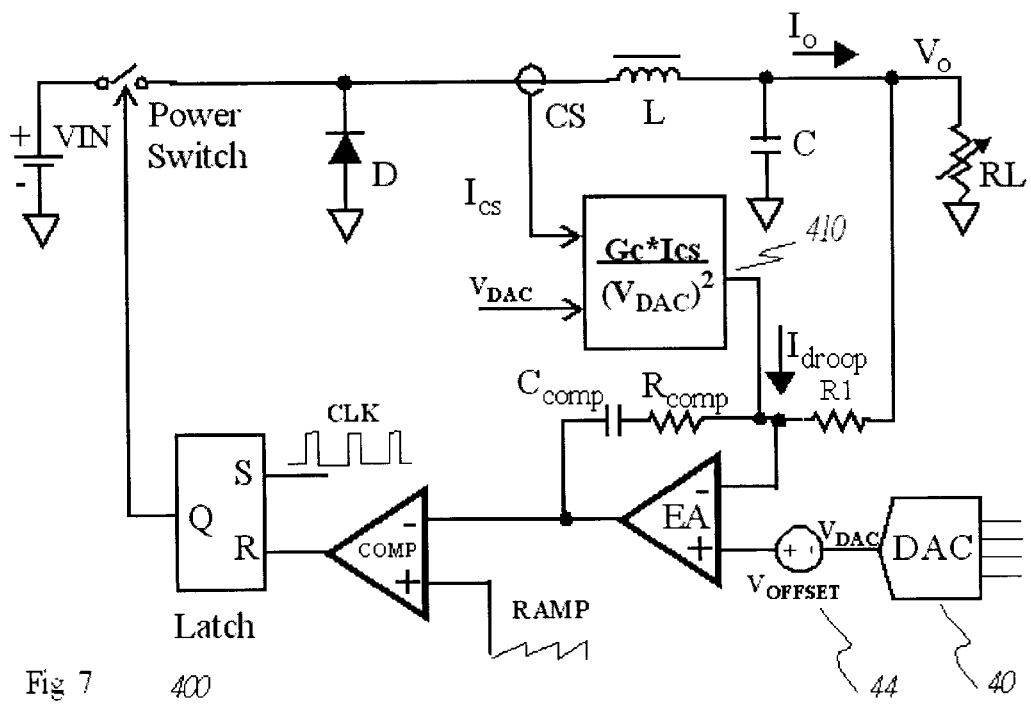
Fig. 7    400

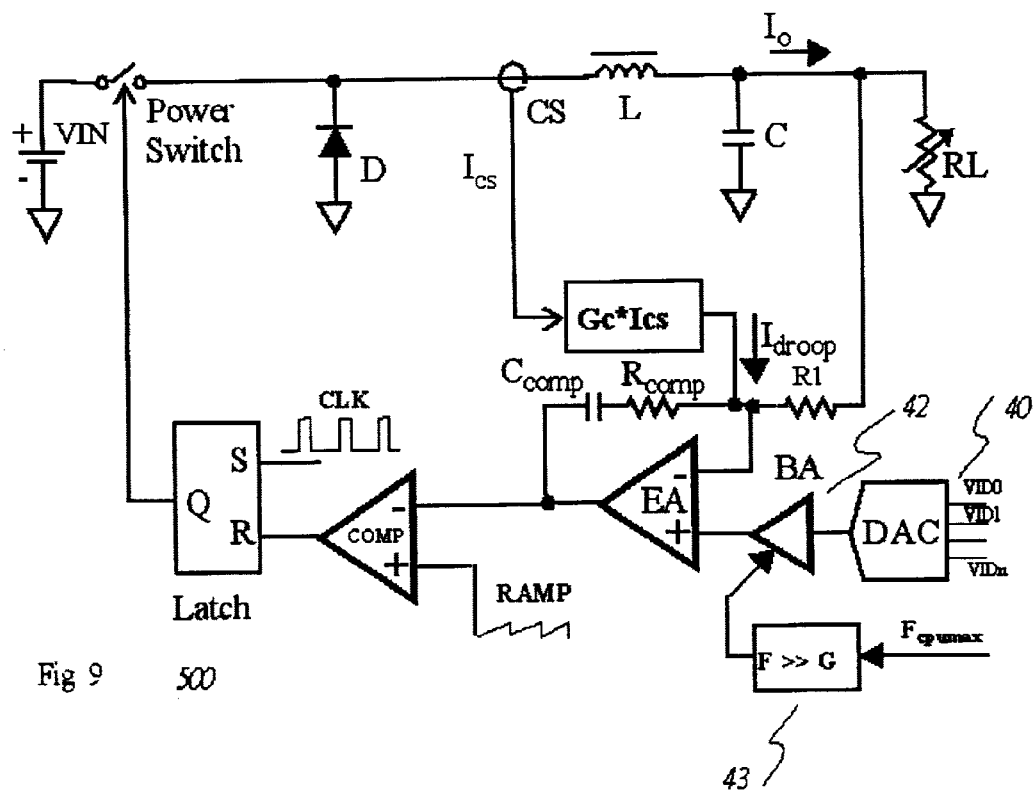
Fig 9    500
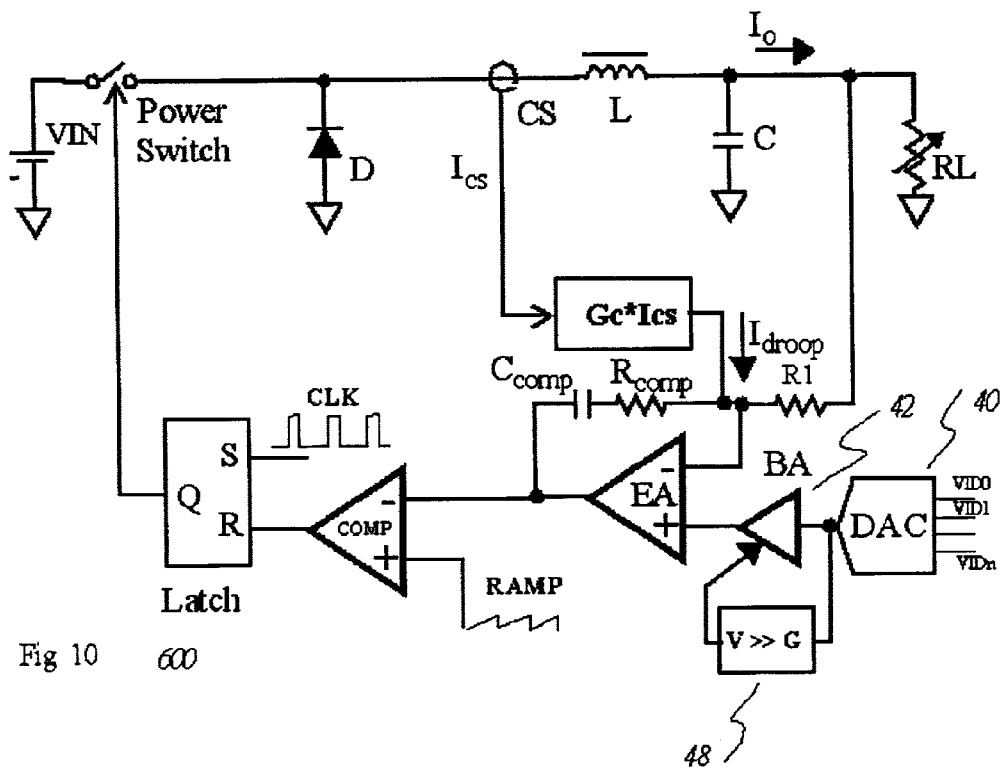
Fig 10   600

METHODS TO CONTROL THE DROOP WHEN POWERING DUAL MODE PROCESSORS AND ASSOCIATED CIRCUITS

CROSS-REFERENCE TO RELATED APPLICATIONS

This application claims the benefit of U.S. patent application Ser. No. 60/192,383 filed Mar. 27, 2000.

BACKGROUND OF THE INVENTION

Use of Dual Mode Processors and Droop in Mobile Computer Applications

Modern notebook computers employ advanced processors with high clock rates that place higher demand on the battery life and impose higher thermal stresses on to the circuit components. To enable systems with higher performance without compromising battery life, dual mode processors were introduced. These processors operate on higher clock rates and higher voltage when the notebook is powered from the wall adapter (so-called "performance mode"). When battery power is used, the operating voltage and the clock frequency are simultaneously scaled down to reduce the consumed power without greatly compromising the computing performance. This is so-called "battery-optimized mode". In battery-optimized mode consumed power is about 40% less than during performance mode with almost equal contribution from the frequency and the voltage scaling.

Power dissipated by a processor is proportional to the clock frequency and to the applied voltage squared.

$$P_{CPU} = K \times F_{CPU} \times V_{CPU}^2 \qquad (1)$$

Considering that the processor power is a product of the operation voltage and the current $P_{CPU} = V_{CPU} \times I_{CPU}$, the processor current is proportional to the processor operating frequency and the voltage applied.

$$I_{CPU} = K \times F_{CPU} \times V_{CPU} \qquad (2)$$

Many computer power management systems deliberately "droop" the CPU voltage to control impedance of the DC/DC converters and to reduce the number of the capacitors required to handle the processor supply current transients. The output voltage of the converter with a droop is inversely proportional to the load current. Reduced power is a key benefit of using the DC/DC converter with a droop to power the processor in the notebooks or other mobile applications with power and thermal constrains. Because the processor power is proportional to the supply voltage squared, even small reductions in the output voltage within the tolerance window translate into measurable reductions in the power dissipated. The additional power reduction may be about 10% and results in extra battery life.

Known Method of Droop Implementation

The FIG. 1 illustrates one known method of implementing droop in the DC/DC converter. The converter 10 includes a DC source VIN that is selectively coupled to a power switch 14. The switch 14 may include one or more power devices in the form of a bridge. The output current $I_O$ is connected to the load RL via an inductor 24 and a capacitor 26. The output current is sensed as current $I_{CS}$ and is connected to a current gain circuit 30. The output of the current gain circuit is the current $I_{DROOP}$. It is coupled to a node 36 at one input of error amplifier 50. Also connected to the node 36 is resistor R1 and the RC feedback circuit of $C_{COMP}$ and $R_{COMP}$. The other input to the error amplifier is provided by the digital to analog converter (DAC) 40 and buffer amplifier 42. They set the reference voltage for the error amplifier 50. The output of the error amplifier is connected to one input of a comparator 60. Its other input receives a ramp signal. The output of the comparator is connected to a latch 18 that is controlled by a clock signal CLK. The output of the latch 18 controls the operation of the power switch 14 to the turn the DC power on and off.

The sensed current signal $I_{CS}$ is proportional to the load current $I_o$, $I_{CS}$ can be either inductor current, or switch current, or diode (or synchronous switch) current. It is scaled down and transformed into the current $I_{DROOP}$ that creates a feedback signal as the voltage drop across the resistor R1. At the input of the voltage-loop error amplifier $I_{DROOP}$ is summed with the voltage feedback signal. As a result, the output voltage of the converter 10 is lowered proportionally to the sum of the droop and load currents. In other words, by changing the fed back voltage from the load voltage to the load voltage less the desired droop, the output of the error amplifier and the power supply is adjusted to provide the desired droop.

The output voltage of the loaded converter varies in accordance with the following equation.

$$V_{CPU}(I) = V_{CPU}(0) - V_{DROOP}(I), \qquad (3)$$

Where:

$V_{CPU}(0) = V_{DAC} \times (1 + \Delta/2)$—is the output voltage with no load. This voltage is usually somewhat higher then nominal voltage commanded by the DAC reference. Normally, the droop is centered to the half-load current. It means that at half-load current the output voltage is equal to the voltage commanded by the DAC.

$\Delta$—is the desired droop value given as a fraction of the $V_{DAC}$.

$V_{DROOP}(I) = R1 \times G_C \times I_{CPU}$—is the droop in the output voltage due to load current—proportional voltage-drop across the resistor R1. The above droop circuit and other droop circuits are shown and described in U.S. patent application Ser. No. 09/591,560 filed Jun. 9, 2000, assigned to the owner of this invention and incorporated herein by reference.

Problems with Conventional Droop Implementation

When the dual mode processors are used, it is desired to have an adequate droop (equal fractions of the commanded output voltage) in both modes of operation. The known droop method does not provide relatively equal droop for the different operation modes because the gain in the current feedback loop is constant. Indeed, constant gain is a fundamental characteristic of conventional negative feedback circuit designs.

Using (2) and (3), the equation for the converter 10 output voltage can be obtained in the following form, which shows that the converter output voltage is not only inversely proportional to the load current but is also inversely proportional to the processor clock frequency $F_{CPU\,max}$.

$$V_{CPU}(I) = V_{DAC}\left(1 + \frac{\Delta}{2}\right) - R1 \times G_C \times K \times F_{CPU\,max} \times K_f \times V_{CPU}(I) \qquad (4)$$

$$V_{CPU}(I) = \frac{V_{DAC} \times \left(1 + \frac{\Delta}{2}\right)}{1 + R1 \times G_C \times K \times F_{CPU\,max} \times K_f}$$

Where:

$F_{CPU\,max} \times K_f$ represents variable processor performance, which varies due to modulating multiplier $K_f=0\ldots 1$. This multiplier simulates the factor how the processor is engaged by the software. When $K_f=0$, the processor idles and its current is close to zero. When $K_f=1$, the performance and the load current have their maximum values. This model is involved for illustrative purposes only to evaluate the considered solutions and does not cover all the aspects of the processor operation.

The value of the gain constant $G_C$ for circuit 30 of converter 10 can be found as:

$$G_C = \frac{2 \times \Delta}{(2-\Delta) \times R1 \times K \times F_{CPU\,max}}. \quad (5)$$

The droop is usually tuned to handle the worst case transient that is associated with the performance mode where the processor current is high. When the processor is switched to operate in the battery mode, the operating frequency and voltage are scaled down. In this case, the processor current is significantly lower, the droop is much smaller and its benefits deteriorated. If gain was tuned to create the optimal droop for the battery-optimized mode, the droop becomes excessive in the performance mode.

The following examples illustrate this asymmetrical feature of droop versus processor mode. For example, a known dual mode processor has the following power parameters at high performance mode: V1=1.6 V, Imax=10.2 A, F=600 MHz, where V is the processor voltage, Imax—is the maximum processor current, F—is the clock frequency. In the battery mode these parameters are V2=1.35 V, Imax 6.8 A, F=500 MHz. The current feedback gain is set to achieve 5% droop. In the first case, the droop is tuned to the performance mode. In the second case, the droop is tuned to be optimal in the battery-optimized mode. In both cases the processor constant is equal to 10.5 nF.

The results in Table 1 show that it is impossible to tune the droop in the known converter to be satisfactory for both operation modes. For example, when droop is tuned for the performance mode, only 84% of the desired droop range is used in the battery-optimized mode.

FIG. 2 graphically illustrates how the converter voltage depends on the load current in different modes of operation. The $K_f$ factor helps to do that using the same scale. It can be easily seen that in the performance mode (VCPU1) the droop is perfectly centered and its value complies with the design goal. The $\pm\Delta\%$ is $\pm 2.5$. Inversely, in the battery optimized mode (VCPU2) the output voltage reaches the nominal value at about 60% of the load and the droop range is not completely used. This can lead to the situation when the converter output voltage violates the load transient specifications at fast load change.

TABLE 1

| | | V(o), V | V(Imax) V | Vnom, V | +Δ, mV | −Δ, mV |
|---|---|---|---|---|---|---|
| Droop Tuned to Perf. Mode | Performance Mode | 1.640 | 1.56 | 1.6 | +40 | −40 |
| | Battery Mode | 1.384 | 1.327 | 1.35 | +34 | −23 |
| Droop Tuned to Battery Mode | Performance Mode | 1.640 | 1.545 | 1.6 | +40 | −55 |
| | Battery Mode | 1.384 | 1.316 | 1.35 | +34 | −34 |

To provide an equal droop the converter output characteristic should have either a) different slope; e.g. current gain at different $F_{CPU\,max}$ to provide relatively equal droop in the performance and the battery optimized modes, or b) a different offset voltage applied to the error amplifier reference input depending on $F_{CPU\,max}$, or c) a fixed droop regardless of operating conditions, or d) a combination of such features to provide for symmetrical droop.

SUMMARY OF THE INVENTION

The invention solves the problem of deteriorating or asymmetrical droop by adjusting the droop in accordance with the operating mode of the processor. In its broader aspects, the invention provides a novel method and apparatus for adjusting droop to match and compensate for changes in operating modes.

The method of the invention is used in an electronic system having a DC/DC converter that operates in one of at least two modes of operation for supplying power to a processor in the electronic system. Each mode of operation includes a nominal operating voltage, operating frequency and operating current. The steps of the method include comparing an output DC voltage to a reference DC signal that represents the desired DC output voltage, generating a pulse-width-modulated control signal, by comparing the error signal with a ramp signal, or by other means known in the art of DC/DC converters. The pulse width modulated signal is converted into the desired DC output voltage by usual circuit components, such as an inductor and a capacitor. The DC output voltage is applied to the load. The method uses one of several known circuits for generating droop voltage.

In the preferred embodiment, the voltage droop is adjusted with a feedback loop. In the feedback loop the method sums one signal dependent upon the output DC voltage with a first signal dependent upon the load current and a second signal dependent upon the operating mode. In response to a change in operating mode the feedback loop adjusts the voltage droop signal to be substantially symmetrical.

In one embodiment the invention alters the slope of the load line to adjust the voltage droop to provide relatively equal droop provided in each mode of operation. In a second embodiment the invention alters the slope of the load line to adjust the droop to provide a droop that is centered and has a constant absolute value in any of selected operating modes. In a third embodiment the invention offsets the reference of the feedback amplifier to adjust the droop to provide a relatively equal droop in each mode of operation without altering the slope of the load line.

The method of the invention is implemented in several novel embodiments. Each embodiment has customary elements including a power switch that includes a MOSFET bridge, a comparator and a latch. The comparator has one input supplied with a conventional ramp function. The other input is supplied by the variable gain feedback loop. That loop includes an error amplifier having first and second inputs and generates an output error signal for controlling droop of the output voltage of the converter. The first input is a summing input that is electrically connected to the output voltage and the output current of said DC/DC converter. The summing input is configured for adding together signals that depend upon the output voltage and the output current. The second input of the error amplifier receives a reference signal that depends upon the desired operating voltage of the processor. The error amplifier generates an output error signal and adjusts its error signal depending at least in part upon the output voltage and the output current. A means for adjusting the power supply droop about the median of the operating voltage of the processor is coupled to one of the input of the error amplifier and depend upon the mode of operation of the processor including the operating voltage, operating current or operating frequency. The comparator receives the error signal and the ramp signal and has its output connected through a latch to control the power switch/bridge. The power switch has an on condition and an off condition. The converter is configured for supplying dc current to the load when in said on condition. The power switch has a control input electrically connected to said comparator output signal. The power switch responds to the output signal of the comparator to change between its on and off conditions.

In one embodiment the adjusting means coupled to the input of the error amplifier is a circuit that receives (a) a signal inversely proportional to the operating frequency of the processor and (b) the output current signal. The adjusting means generates the first input signal to the error amplifier so that its first input signal depends upon the product of the (a) signal inversely proportional to the operating frequency of the processor and (b) the output current signal. This changes the slope of the load line of the converter upon the processor's operating mode.

In another embodiment when reduction in the processor consumption in battery-optimized mode is anticipated to be achieved by approximately equal contributions of voltage and frequency scaling, the adjusting means is a multiplier circuit that includes a matrix current decoder. It includes a plurality of current sources of different currents. A first input corresponding to the output current is connected to all the current sources, a second input corresponding to the operating voltage of the processor selects a current source inversely proportional to the operating voltage and generates the first input to the error amplifier. That input changes the slope of the load line of the converter upon the processor's operating mode.

In another embodiment when a constant processor operating mode independent droop is desired and reduction in the processor consumption in battery-optimized mode is anticipated to be achieved by approximately equal contributions of voltage and frequency scaling, the adjusting means coupled to the input of the error amplifier is a circuit that receives a (a) signal inversely proportional to the operating frequency of the processor, (b) a signal inversely proportional to the processor set voltage and (c) the output current signal. The adjusting means generates a first input signal to the error amplifier so that its first input signal depends upon the product of the (a) signal inversely proportional to the operating frequency of the processor, (b) signal inversely proportional to the processor set voltage and (c) the output current signal. This changes the slope of the load line of the converter upon the processor's operating mode in the way that droop has a constant absolute value in any mode.

In another embodiment when a constant processor operating mode independent droop is desired, the adjusting means is a multiplier circuit that includes a matrix current decoder. It includes a plurality of current sources of different currents. A first input corresponding to the output current is connected to all the current sources, a second input corresponding to the operating voltage of the processor selects a current source inversely proportional to the operating voltage squared and generates a first input to the error amplifier. That input changes the slope of the load line of the converter upon the processor's operating mode in the way that the absolute value of the droop remains essentially the same despite of changes in processor operating modes.

The DC/DC converter may alter the feedback loop by providing a voltage source to offset the second (reference) input of the error amplifier. In that case the DC/DC converter has a buffer amplifier with a variable gain. It receives a gain control signal that depends upon the processor operating voltage or upon the operating frequency of the processor. The buffer amplifier generates the second (reference) input to the error amplifier to offset the droop by both the processor frequency and the processor voltage. This offsets the droop upon processor operating mode without changing the slope of the converter output characteristic.

A further embodiment of the invention includes a buffer amplifier with a gain control signal generator that includes a matrix decoding circuit. It has a plurality of resistors with its transfer gain inversely proportional to the processor voltage. This offsets the droop upon processor operating mode and in high degree symmetrically positions it along the half-load current.

DRAWINGS

FIG. 6 is a schematic drawing of a DC/DC converter with a constant droop and triple control droop circuit.

FIG. 7 is a schematic drawing of a DC/DC converter with a constant droop and voltage control.

FIG. 9 is a schematic drawing of a DC/DC converter with a dual control droop circuit under frequency set offset.

FIG. 10 is a schematic drawing of a DC/DC converter with a dual control droop circuit and voltage programmed offset.

DETAILED DESCRIPTION OF THE INVENTION

One significant attribute of this invention is an adjustable droop control that is achieved by varying the gain in the current feedback loop. The current loop gain is made to be inversely proportional to the processor maximum operating frequency. This effectively changes the slope of the converter's load line in accordance with the operating mode of the processor. The sensed current signal, which can be either inductor current, or switch current, or diode (or synchronous switch) current, is multiplied by the signal inversely proportional to the processor maximum operating frequency. A resulting current product signal is summed with the voltage feedback signal at the input of the voltage-loop error amplifier.

Figure 2:
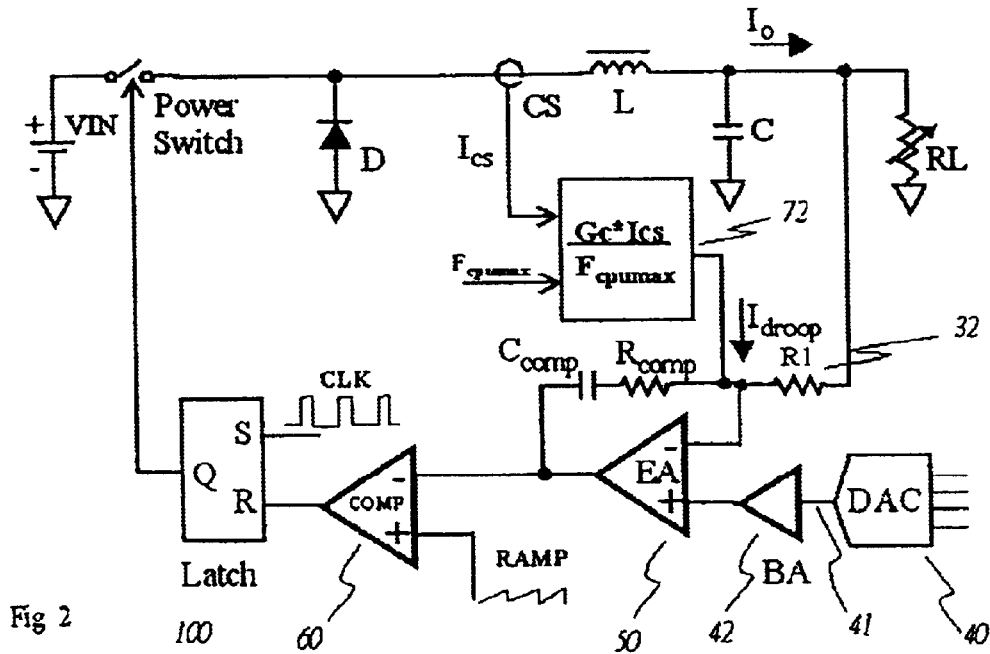
FIG. 2 is a schematic drawing of a DC/DC converter with a dual control droop under frequency control.

FIG. 2 illustrates one implementation of the new method to provide the droop. The converter 100 has a DAC 40 that receives a code associated with desired processor operating voltage and sets the reference voltage on its output 41. The reference voltage ($V_{DAC}$) is boosted by the buffer amplifier 42 to center the droop along the median load. The level of the offset is programmed by the gain of the buffer amplifier. A sensed current signal $I_{CS}$ 22 is proportional to the load current $I_o$ 24 and can be either inductor current, or switch current, or diode (or synchronous switch) current. In all cases it is scaled down by the factor of gain $G_c$. Additionally, this current is multiplied in a multiplier circuit 72 by the signal inversely proportional to the processor clock frequency $F_{CPU\,max}$ and transformed to the current $I_{DROOP}$ 32 that creates the voltage drop across the resistor R1. At one input of the voltage-loop error amplifier 50 this voltage drop is summed with the voltage feedback signal. The other input is coupled to the buffer amplifier output. As a result, the output voltage of the converter 100 is inversely proportionally to the load current and is invariant to the processor clock frequency changes associated with the processor mode switchover.

The output voltage of the loaded converter with a new droop method varies in accordance with the following equation $$V_{CPU}(I) = \frac{V_{DAC} \times \left(1 + \frac{\Delta}{2}\right)}{1 + K \times F_{CPU\,max} \times K_f \times R1 \times \frac{G_C}{F_{CPU\,max}}} \quad (6)$$

$$= \frac{V_{DAC} \times \left(1 + \frac{\Delta}{2}\right)}{1 + K \times K_f \times R1 \times G_C},$$

and ideally has $V_{DAC}$ proportional droop, which is measured as a fraction of $V_{DAC}$.

The value of the gain constant $G_C$ can be found as:

$$G_C = \frac{2 \times \Delta}{(2 - \Delta) \times R1 \times K}. \quad (7)$$

Figure 3:
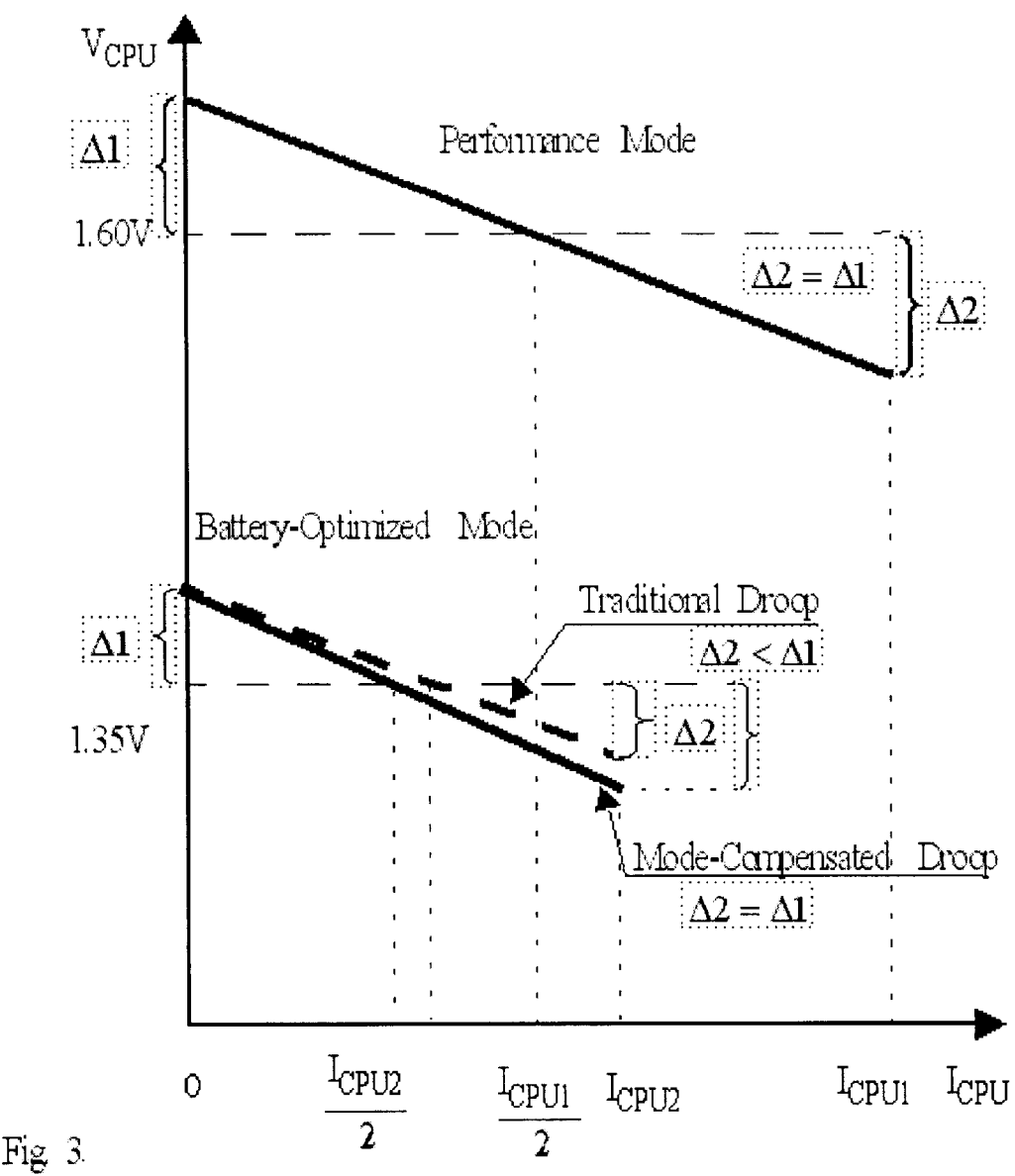
FIG. 3 is a graphical comparison of performance and battery modes of operation with and without one embodiment of the invention.

Table 2 and FIG. 3 illustrate that the new droop method allows one skilled in the art to achieve converter output characteristics that are compensated for both operating voltage and frequency changes. As shown in FIG. 3, the slope of the load line is different for performance and battery optimizations. The invention alters the slope of the load line in accordance with the operating mode of the processor. Without the invention, the load line has the same slope for battery-optimized and performance mode of operation. As shown in FIG. 3, with the invention the slope of the load line is changed from the uncompensated, traditional slope to a slope that is steeper than the load line for the performance optimized mode. This assures that the droop is centered to the median load and the processor power specifications will not be violated in any operation mode.

TABLE 2

| | | V(o) | V (Imax) | Vnom | +Δ | −Δ | +Δ % | −Δ % |
|---|---|---|---|---|---|---|---|---|
| Droop Tuned to Perf. Mode | Performance Mode | 1.640 | 1.56 | 1.6 | +40 | −40 | +2.5 | −2.5 |
| | Battery Mode | 1.384 | 1.316 | 1.35 | +34 | −34 | +2.5 | −2.5 |
| Tuned to Battery Mode | Performance Mode | 1.640 | 1.56 | 1.6 | +40 | −40 | +2.5 | −2.5 |
| | Battery Mode | 1.384 | 1.316 | 1.35 | +34 | −34 | +2.5 | −2.5 |

Figure 4:
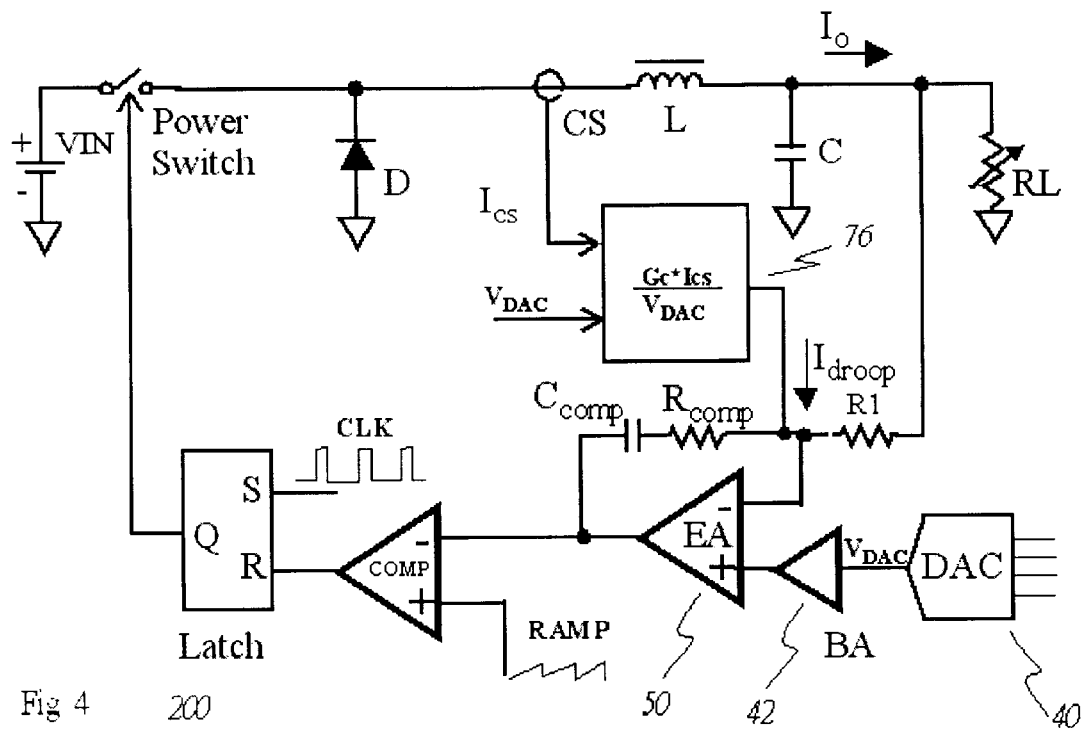
FIG. 4 is a schematic drawing of a DC/DC converter with a dual control droop under voltage control.

However, the information about the processor operating frequency is not always readily available in a form useful to the converter. Therefore, another solution is given in the converter 200 of FIG. 4. A signal proportional to the processor clock frequency is substituted by the signal derived from the reference ($V_{DAC}$) voltage. Because power reduction is usually done with approximately equal contribution from the voltage and the frequency scaling, some error is acceptable for the practical implementations.

In this embodiment, the gain in the current feedback loop is made to be inversely proportional to the reference voltage. This is accomplished in the following way. The sensed current signal Ics is proportional to the load current $I_o$. $I_{CS}$ can be either inductor current, or switch current, or diode (or synchronous switch) current. It is scaled down by the factor of gain $G_c$. In multiplier 76 the current $I_{CS}$ is multiplied by a signal inversely proportional to the commanded processor operating voltage ($V_{DAC}$) and is transformed to the current $I_{DROOP}$, which creates the voltage drop across the resistor R1. At one input of the voltage-loop error amplifier 50 this voltage drop is summed with the voltage feedback signal. The other input is coupled to a reference voltage provided by DAC 40 and buffer amplifier 42. As a result, the output voltage of the converter is inversely proportionally to the load current and is in high degree invariant to the processor clock frequency changes associated with the processor mode switchover.

The output characteristic of the converter, which employs this embodiment of the invention, is described by the following equation.

$$V_{CPU}(I) = \frac{V_{DAC} \times \left(1 + \frac{\Delta}{2}\right)}{1 + R1 \times K \times F_{CPUmax} \times K_f \times \frac{G_C}{V_{DAC}}} \quad (8)$$

$$= \frac{V_{DAC}^2 \times \left(1 + \frac{\Delta}{2}\right)}{V_{DAC} + K \times F_{CPU\,max} \times K_f \times R1 \times G_C}$$

The value of the gain constant $G_C$ can be found as:

$$G_C = \frac{2 \times \Delta \times V_{DAC}}{(2 - \Delta) \times R1 \times K \times F_{CPU\,max}}. \quad (9)$$

The numerical example identical to the one used for the known art is given in the Table. 3.

These results show that effective droop range is expanded to 99% in the battery-optimized mode compare to 84% for the known art. Also, the droop is centered across the median load and the processor power specifications will not be violated in any operation mode.

TABLE 3

|  |  | V(o) | V (Imax) | Vnom | +Δ, mV | −Δ, mV | +Δ % | −Δ % |
|---|---|---|---|---|---|---|---|---|
| Droop Tuned to Perf. Mode | Performance Mode | 1.640 | 1.560 | 1.6 | +40 | −40 | +2.5 | −2.5 |
|  | Battery Mode | 1.384 | 1.317 | 1.35 | +34 | −33 | +2.5 | −2.4 |
| Tuned to Battery Mode | Performance Mode | 1.640 | 1.559 | 1.6 | +40 | −41 | +2.5 | −2.6 |
|  | Battery Mode | 1.384 | 1.318 | 1.35 | +34 | −34 | +2.5 | −2.5 |

Figure 5:
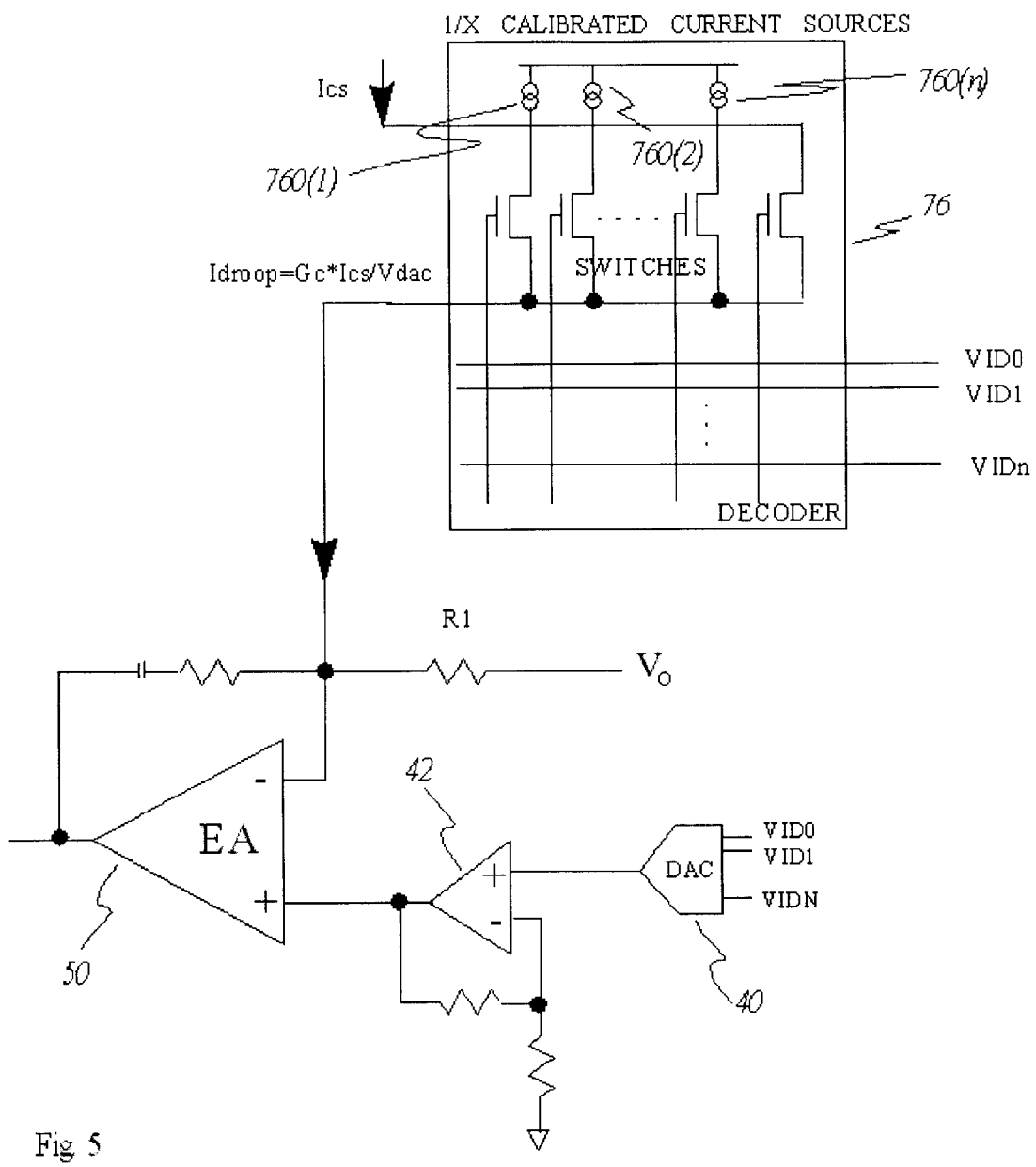
FIG. 5 is a schematic drawing of a practical implementation of dual control droop under voltage control.

The circuit 76 is shown in greater detail in FIG. 5. The current sense signal is multiplied by a signal inversely proportional to the commanded processor operating voltage ($V_{DAC}$) and transformed it into the current $I_{DROOP}$, which creates required voltage drop on resistor R1 at the input of the voltage-loop error amplifier. In decoder 76 the current sensed signal $I_{CS}$ is mixed with the current from a row of calibrated current sources 720 (1), 720 (2) . . . 720(n). Each current source can be activated by the matrix decoder 710, which accepts the same VID code as the DAC. The value of the current supplied by each subsequent in the row current source is proportional to 1/X function. The decoder 310 is programmed in the way that VID code is essentially choosing the current source with the current value appropriate to accomplish the desired $1/V_{DAC}$ function.

In some cases it is desired to have a constant droop that is independent of the operating point. For that case, the gain in the current feedback is made to be inversely proportional to the reference voltage and to the processor operating frequency. This is accomplished in the way shown in converter 300 of FIG. 6.

The DAC 40 receives the code associated with the desired operating voltage and sets the reference voltage on its output. The reference voltage ($V_{DAC}$) is increased by the fixed value $V_{OFFSET}$ 44 to center the droop along the half-load current. The sensed current signal Ics, which is proportional to the load current Io and can be either inductor current, or switch current, or diode (or synchronous switch) current, is scaled down by the factor of gain $G_c$. Additionally, this current is multiplied in multiplier 310 by a signal inversely proportional to the programmed processor operating voltage ($V_{DAC}$) and a signal inversely proportional to the processor set frequency and is transformed to the current $I_{DROOP}$, which creates the voltage drop across the resistor R1. At one input of the voltage-loop error amplifier 50 this voltage drop is summed with the voltage feedback signal. The other input is a reference voltage dependent upon $V_{DAC}$ and the offset voltage. As a result, the output voltage of the converter is inversely proportionally to the load current and resembles a droop, which has a constant value in any processor-operating mode.

The output characteristic of the converter with is described by the equation $$V_{CPU}(I) = \frac{V_{DAC} + V_{DROOP}/2}{1 + \frac{K \times F_{CPU\,max} \times K_f \times R1 \times G_C}{V_{DAC} \times F_{CPU\,max}}} \quad (10)$$

$$= \frac{V_{DAC}(V_{DAC} + V_{DROOP}/2)}{V_{DAC} + K \times K_f \times R1 \times G_C}$$

The value of the gain constant $G_c$ for this case can be found as:

$$G_C = \frac{V_{DAC}}{R1 \times K} \left( \frac{2 \times V_{DAC} + V_{DROOP}}{2 \times V_{DAC} - V_{DROOP}} - 1 \right). \quad (11)$$

Where: $V_{DROOP}$—is a desired droop voltage, which has a constant value.

Tentatively, $V_{DROOP} = 2 * V_{OFFSET}$.

Figure 8:
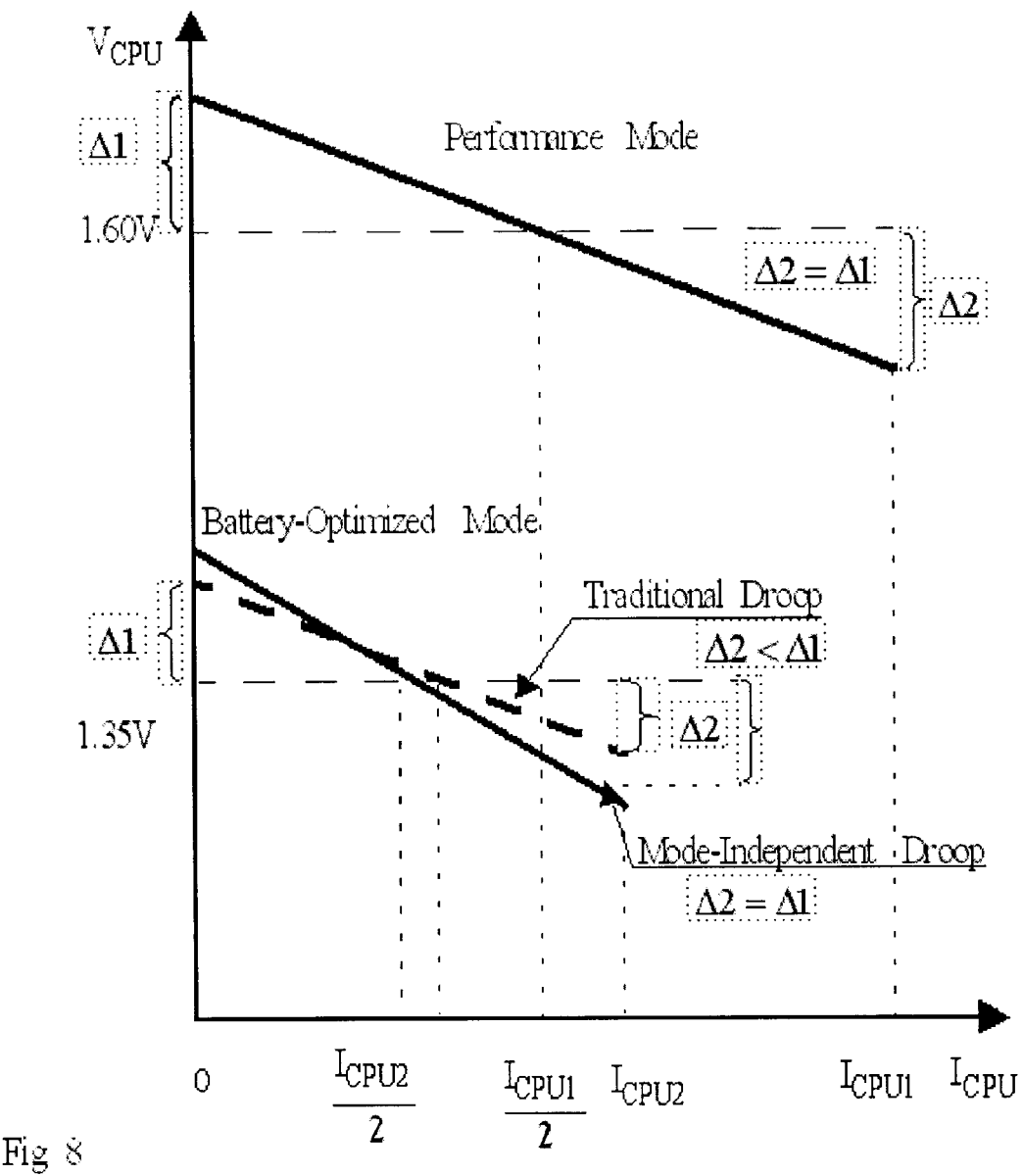
FIG. 8 is a graphical comparison of the operation of the circuit of FIG. 6 and FIG. 7 with a prior art under performance and battery operation.

The numerical example given in the Table. 4 and FIG. 8 illustrate performance of the converter that employs this droop method. Practically constant droop is achieved with this approach. FIG. 8 shows that the droop is centered across the median load and the processor power specifications will not be violated in any operation mode.

TABLE 4

|  |  | V(o) | V(Imax) | Vnom | +Δ, mV | −Δ, mV |
|---|---|---|---|---|---|---|
| Droop Tuned to Perf. Mode | Performance Mode | 1.64 | 1.56 | 1.60 | +40 | −40 |
|  | Battery Mode | 1.39 | 1.31 | 1.35 | +40 | −40 |
| Tuned to Battery Mode | Performance Mode | 1.64 | 1.56 | 1.60 | +40 | −40 |
|  | Battery Mode | 1.39 | 1.31 | 1.35 | +40 | −40 |

In cases when constant, operating point independent droop might be desired and a signal associated with the processor operating frequency is not readily available in a suitable form, the gain in the current feedback is made to be inversely proportional to the reference voltage squared. This is accomplished in the way shown in converter 400 of FIG. 7.

The DAC 40 receives the code associated with the desired operating voltage and sets the reference voltage on its output. The reference voltage ($V_{DAC}$) is increased by the fixed value $V_{OFFSET}$ 44 to center the droop along the median load. The sensed current signal Ics, which is proportional to the load current Io and can be either inductor current, or switch current, or diode (or synchronous switch) current, is scaled down by the factor of gain $G_c$. Additionally, this current is multiplied in multiplier 410 by a signal inversely proportional to the commanded processor operating voltage ($V_{DAC}$) squared and is transformed to the current $I_{DROOP}$, which creates the voltage drop across the resistor R1. At one input of the voltage-loop error amplifier 50 this voltage drop is summed with the voltage feedback signal. The other input is a reference voltage dependent upon $V_{DAC}$ and the offset voltage. As a result, the output voltage of the converter is inversely proportionally to the load current, e.g. resembles a droop, which has a constant value in any processor-operating mode.

The output characteristic of the converter with is described by the equation $$V_{CPU}(I) = \frac{V_{DAC} + V_{DROOP}/2}{1 + K \times F_{CPU\,max} \times K_f \times R1 \times \frac{G_C}{V_{DAC}^2}} \quad (13)$$

$$= \frac{V_{DAC}^2(V_{DAC} + V_{DROOP}/2)}{V_{DAC}^2 + K \times F_{CPU\,max} \times K_f \times R1 \times G_c}$$

The value of the gain constant $G_C$ can be found as:

$$G_C = \frac{2 \times \Delta \times V_{DAC}^2}{(V_{DAC} - \Delta) \times R1 \times K \times F_{CPU\,max}}. \tag{14}$$

Where: $V_{DROOP}$—is a desired droop voltage, which has a constant value.
Tentatively, $V_{DROOP}=2*V_{OFFSET}$.

Figure 12:
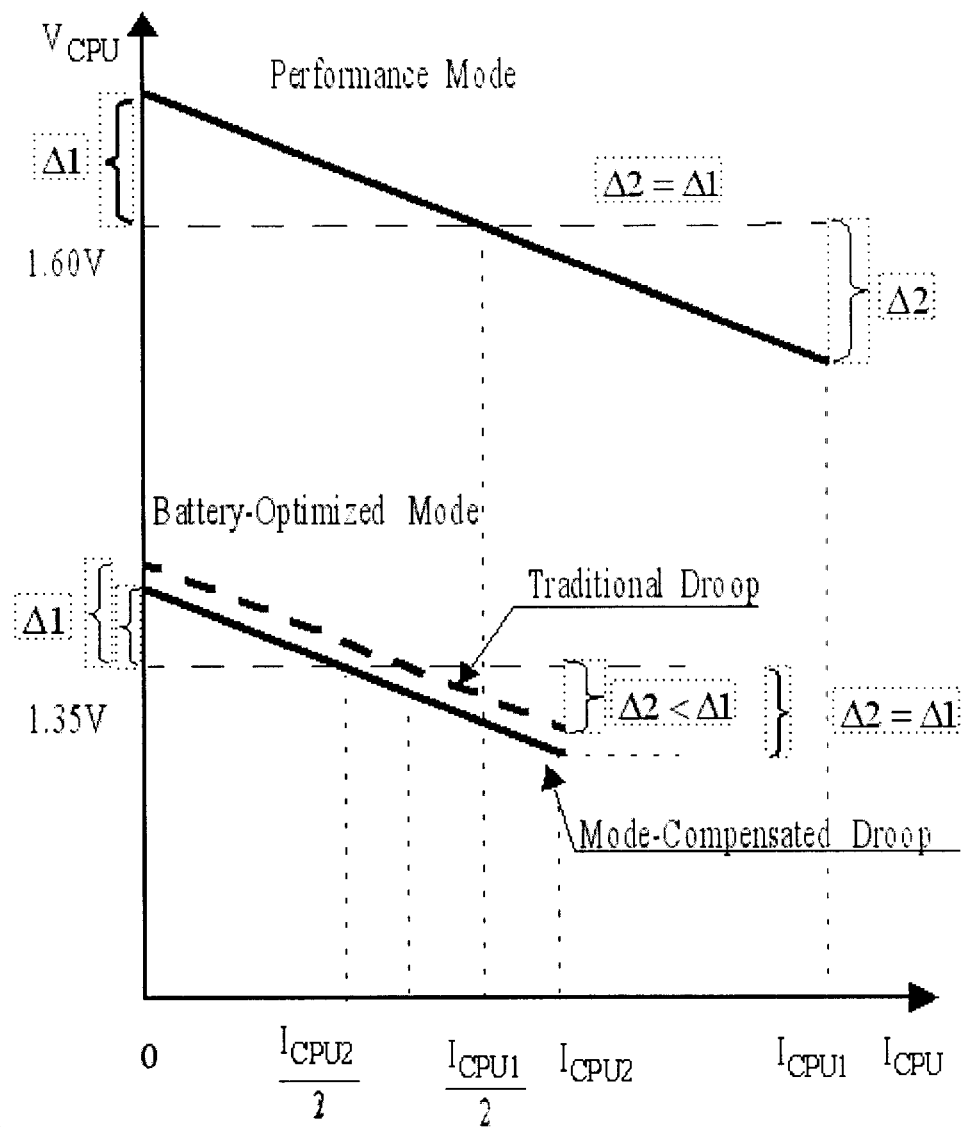
FIG. 12 is a graphical comparison of the operation of circuits of FIG. 9 and FIG. 10 with a prior art under performance and battery operation.

A numerical example given in the Table. 5 illustrates performance of the converter, which employs this droop method. Practically constant droop is achieved with this approach. Table 5 and FIG. 12 show that the droop is centered across the median load and the processor power specifications will not be violated in any operation mode.

TABLE 5

| | | V(o) | V(Imax) | Vnom | +Δ, mV | -Δ, mV |
|---|---|---|---|---|---|---|
| Droop Tuned to Perf. Mode | Performance Mode | 1.64 | 1.56 | 1.6 | +40 | -40 |
| | Battery Mode | 1.39 | 1.311 | 1.35 | +40 | -39 |
| Tuned to Battery Mode | Performance Mode | 1.64 | 1.559 | 1.6 | +40 | -41 |
| | Battery Mode | 1.39 | 1.31 | 1.35 | +40 | -40 |

As shown above, the described power supplies for modem dual mode processors have a symmetrically positioned droop in every operational mode. This assures that processor power specifications will not be violated during load current transients, and that the processor is consuming the lowest amount of power in all operating modes with droop implemented.

To achieve the same goal of symmetrical droop in different modes of operation, one may offset the converter output voltage in am amount proportional to the programmed voltage and the processor maximum operating frequency.

FIG. 9 illustrates a circuit 500 that adjusts droop in accordance with the operating mode of the processor as described above. The DAC 40 receives the code associated with the desired processor operating voltage and sets the reference voltage on its output. The buffer amplifier 42 (BA) with a controlled gain boosts the reference voltage $V_{DAC}$ to accommodate the droop. The level of the offset is programmed by the gain of the buffer amplifier 42. A signal $F_{CPU\,max}$ 43 proportional to the processor clock frequency is generated and controls the gain of the buffer amplifier. This forces the level of the initial offset to be proportional to both voltage and frequency. The sensed current signal $I_{CS}$ is proportional to the load current $I_O$ and can be either inductor current, switch current, or diode (or synchronous switch) current. $I_{CS}$ is scaled down by the factor of gain $G_c$. This current creates the voltage drop across the resistor R1. At the input of the voltage-loop error amplifier 50, this voltage drop is summed with the voltage feedback signal. As a result, the output voltage of the converter is now inversely proportional to the load current and is symmetrically positioned along the median load current.

The output voltage of the loaded converter 500 with this new voltage positioning method now varies in accordance with the following equation $$V_{CPUi}(I) = \frac{V_{DACi} + V_{offseti}}{1 + K \times F_{CPU\,maxi} \times K_f \times R1 \times G_C}; \tag{15}$$

Where:

$$V_{offseti} = \frac{V_{DACi}}{\left(\frac{2-\Delta 1}{\Delta 1}\right) \times \frac{F_{CPU\,max1}}{F_{CPU\,max\,i}} + 1}; \tag{16}$$

is the initial offset; i=1 for the performance mode, and i=2 for the battery optimized mode; Δ1—is the desired droop as fraction of the reference voltage in the performance mode where the circuit is calibrated. The value of the gain constant $G_c$ can be found as $$G_C = \frac{2 \times \Delta}{(2-\Delta) \times R1 \times K \times F_{CPU\,max}}; \tag{17}$$

Table 6 and FIG. 12 illustrate that the new voltage positioning method provides means to achieve converter output characteristics that are symmetrically centered in both operating modes. This assures the processor power specifications will not be violated in any operation mode.

TABLE 6

| | | V(o) | V(Imax) | Vnom | +Δ(mv) | -Δ(mv) |
|---|---|---|---|---|---|---|
| Droop Tuned to Perf. Mode | Performance Mode | 1.640 | 1.56 | 1.6 | +40 | -40 |
| | Battery Mode | 1.378 | 1.322 | 1.35 | +28 | -28 |
| Tuned to Battery Mode | Performance Mode | 1.640 | 1.56 | 1.6 | +40 | -40 |
| | Battery Mode | 1.378 | 1.322 | 1.35 | +28 | -28 |

However, the information about the processor operating frequency is not always readily available in the form convenient for use in the processor voltage-regulating module. Therefore, a further converter circuit 600 is presented in the FIG. 10. There a gain control signal proportional to the processor clock frequency in circuit 500 is substituted by the signal 48 derived from the reference $V_{DAC}$ voltage. For known dual-mode processors a reduction in power consumption is usually done with approximately equal scaling of the voltage and the operating frequency. Because of that, some error will be acceptable for practical implementations.

Converter 600 illustrates the implementation of the new method to control the droop when powering the dual mode processors. The DAC 40 receives the code associated with the desired processor operating voltage and sets the reference voltage on its output. The reference voltage $V_{DAC}$ is boosted by the buffer amplifier 42 (BA), which has a variable gain. The level of the offset is programmed by the gain of the buffer amplifier 42. The same reference signal controls the gain of the buffer amplifier. This forces the level of the initial offset to be proportional to reference voltage squared. The sensed current signal $I_{CS}$ is proportional to the load current $I_O$ and can be either inductor current, switch current, or diode (or synchronous switch) current. $I_{CS}$ is scaled by the factor of gain $G_c$. This current creates a voltage drop across the resistor R1. At the input of the voltage-loop error amplifier, this voltage drop is summed with the voltage feedback signal. As a result, the output voltage of the converter is now inversely proportional to the load current and is in high degree symmetrically positioned along the half-load current.

The output characteristic of the converter, which employs this embodiment of the invention, is described by the generic equation (15), where $V_{offset}$ is determined by the following equation.

$$V_{offseti} = \frac{V_{DACi}}{\left(\frac{2-\Delta}{\Delta}\right) \times K_V \times \frac{V_{DAC1}}{V_{DACi}} + 1}. \quad (18)$$

Where:

$$K_V = \frac{F_{CPU\ max1} \times V_{DACi}}{F_{CPU\ max\ i} \times V_{DAC1}}.$$

Table 7 illustrates how this embodiment of the new voltage positioning method provides a converter output with characteristics that are symmetrically centered in both operating modes. This assures the processor power specifications will not be violated in any operation mode.

TABLE 7

| | | V(o) | V(Imax) | Vnom | +□(mv) | −□(mv) |
|---|---|---|---|---|---|---|
| Droop Tuned to Perf. Mode | Performance Mode | 1.640 | 1.560 | 1.60 | +40 | −40 |
| Perf. Mode | Battery Mode | 1.379 | 1.321 | 1.35 | +29 | −29 |
| Tuned to Battery Mode | Performance Mode | 1.641 | 1.559 | 1.60 | +41 | −41 |
| Mode | Battery Mode | 1.378 | 1.322 | 1.35 | +28 | −28 |

Figure 11:
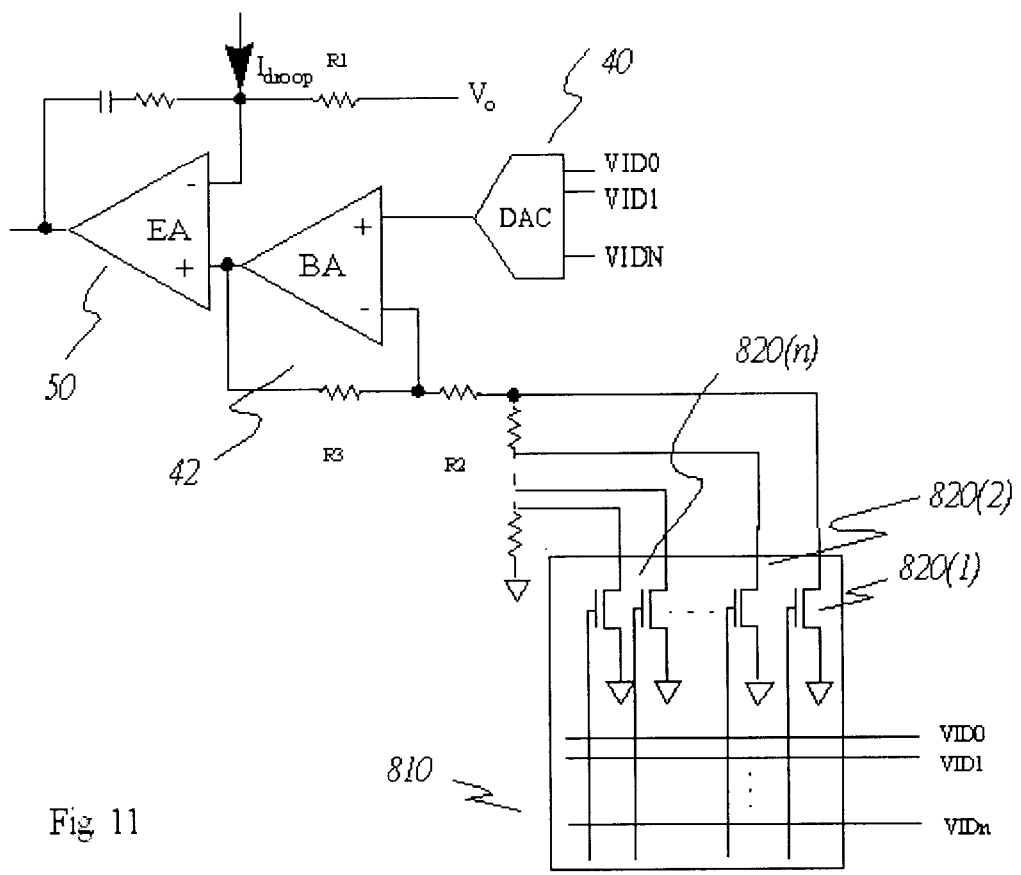
FIG. 11 is a schematic drawing of a practical dual control droop circuit and voltage set offset by matrix decoder.

The gain setting signal 48 is generated by a decoder circuit 810. With reference to FIG. 11 the gain of the buffer amplifier 42 is controlled by the VID code that sets the desired value of the processor operating voltage. The gain of the buffer amplifier 42 is defined as $G_{ba}$=R3/R2+1. Resistor R2 is made of the chain of the resistors that are connected to the drains of the switches 820(n). The VID code is decoded by the decoder 810 connected between VID inputs and the switch gates. The values of the resistors in the resistive chain R2 are chosen accordingly to the VID code so the desired gain is set. The initial offset voltage programmed by this circuit complies with the following equation.

$$\frac{\Delta_i}{2} = \frac{1}{\left(\frac{2-\Delta 1}{\Delta 1}\right) \times K_V \times \frac{V_{DAC1}}{V_{DACi}} + 1} = G_{BA} = \frac{R3}{R2} + 1 \quad (19)$$

Where: $\Delta_i$ is a current value of a droop measured as a fraction of the current value of the VDACi setting at the calibration point. The calibration point VDAC1 could be the highest or the lowest reference voltage, or any other reference voltage from the variety of values programmed by the VID code. Because the described method to control droop affects only the reference voltage of the regulator, it can be implemented in the regulators of both switching and linear nature.

In addition to conserving power in all operational states, utilizing this voltage positioning method may enable processor manufacturers to specify reduced voltage tolerances for their dual mode processor. This reduced voltage tolerance may translate to improved yield characteristics and hence lower manufacturing costs.

Figure 1:
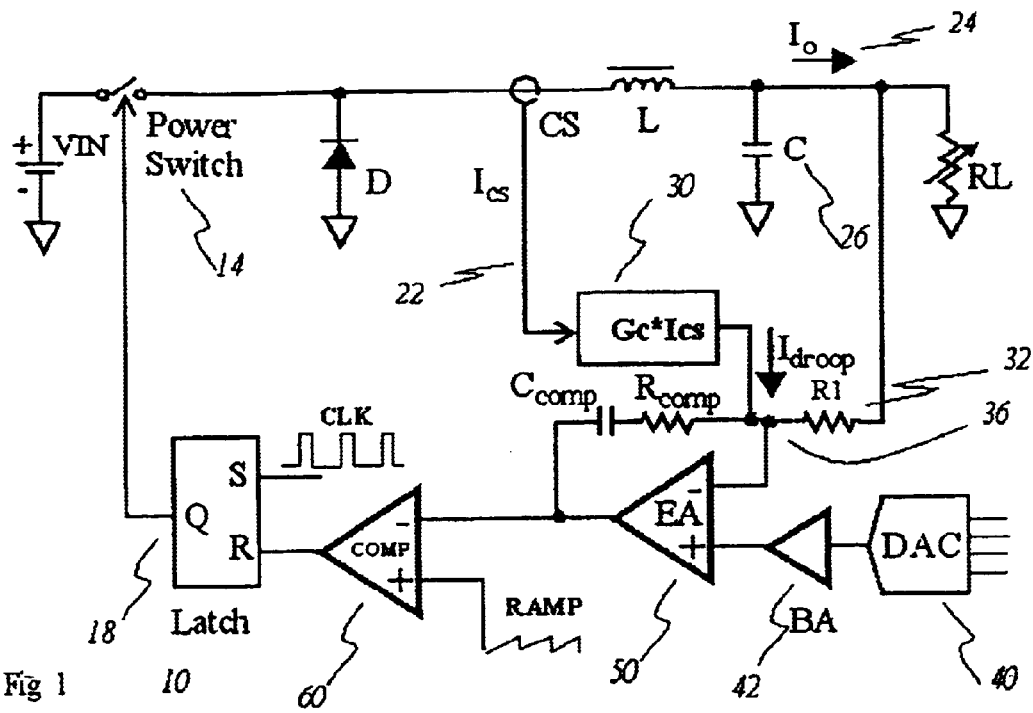
FIG. 1 is a schematic drawing of a prior art DC/DC converter with a droop.

In addition to the embodiments described above, others skilled in the art may adapt the invention for use in other droop generating circuits. The circuit of FIG. 1 is just one example of a droop generating DC/DC converter. For example, linear regulator or hysteretic PWM controller may also the output voltage droop and those circuits can be modified to use the steps and structures of the invention.

What we claim is:

1. In an electronic system having a DC/DC converter supplying power to a processor that operates in one of at least two modes of operation, wherein each mode of operation includes a nominal operating current, operating voltage and operating frequency, a method for reducing power losses comprising the steps of:

generating a pulse width modulated signal corresponding to a desired DC output signal;

converting the pulse width modulated signal into the desired DC output signal;

generating a voltage droop signal;

applying the desired output DC signal and voltage droop signal to a load; in response to a change in processor operating mode, adjusting the voltage droop signal to be substantially symmetrical.

2. The method of claim 1 wherein the step of adjusting the voltage droop signal includes multiplying an output current proportional signal by a signal inversely proportional to the operating frequency of the processor.

3. The method of claim 1 wherein the step of adjusting the voltage droop signal includes multiplying an output current proportional signal by a signal inversely proportional to processor operating voltage.

4. The method of claim 3 wherein the step of adjusting the voltage droop signal includes decoding a current decoder including a plurality of current sources of different currents and having one input corresponding to the output current and connected to all the current sources and another input corresponding the operating voltage of the processor for selecting a current source inversely proportional to operating voltage, and generating the first input to the error amplifier.

5. The method of claim 1 wherein the step of adjusting the voltage droop signal includes comparing the voltage droop signal to a reference signal offset in accordance with the operating frequency of the processor.

6. The method of claim 1 wherein the step of adjusting the voltage droop signal includes comparing the voltage droop signal to a reference signal offset in accordance with a control signal dependent upon the operating voltage.

7. The method of claim 1 wherein the step of adjusting the voltage droop signal includes comparing the voltage droop signal to a reference signal offset in accordance with a control signal dependent upon decoding a voltage matrix decoder having a plurality of voltage reference sources with its output dependent upon the operating processor voltage.

8. The method of claim 1 wherein the step of adjusting the power droop signal includes centering the droop about the operating voltage and keeping the droop constant regardless of the processor operating voltage and the clock frequency by multiplying an output current proportional signal by a signal inversely proportional to the operating frequency of the processor and by a signal inversely proportional to the processor operating voltage.

9. The method of claim 8 wherein the step of centering the voltage droop includes multiplying the output current sense signal by a signal inversely proportional to the operating voltage squared.

10. In an electronic system having a DC/DC converter that operates in one of at least two modes of operation for supplying power to a processor in the electronic system, wherein each mode of operation includes a nominal operating current, operating voltage and operating frequency, a method for reducing power losses comprising the steps of:

comparing an input DC signal to a ramp signal to generate a pulse width modulated output signal corresponding to a desired DC output signal;

converting the pulse width modulated signal into the desired DC output signal;

generating a voltage droop signal;

applying the desired output DC signal and voltage droop signal to a load;

in a feedback loop, summing signals dependent upon the power droop signal and the output DC voltage and comparing the summed voltage droop and output DC dependent signals to a reference signal dependent upon the operating mode;

in response to a change in operating mode, adjusting the voltage droop signal to be substantially symmetrical.

11. A power supply circuit for a multi-mode processor operable in one of at least two modes wherein each mode has an operating voltage, operating current and operating frequency, comprising:

a comparator and an error amplifier coupled to one input of the comparator for controlling the duty ratio of the power supply in accordance with the output of the error amplifier;

a droop control signal generating circuit including means for sensing the output current and for generating a droop control signal proportional to the desired droop the power supply;

means for centering the power supply droop about the median of the operating voltage of the processor, said means for centering coupled to either the error amplifier or to the droop control signal generating circuit and responsive to the mode of operation of the processor including its operating voltage, operating current or operating frequency.

12. The power supply circuit of claim 11 wherein the means for centering the power supply droop comprises means for multiplying the sensed current by a signal inversely proportional to the operating frequency of the processor.

13. The power supply circuit of claim 11 wherein the means for centering the power supply droop comprises means for adjusting initial offset of the output voltage in accordance with the programmed operating voltage of the processor and the operating frequency of the processor.

14. The power supply circuit of claim 11 wherein the means for centering the power supply droop comprises means for centering the power supply droop and means for keeping constant the power supply droop.

15. A power supply circuit for a dual mode processor having a relatively constant droop comprising:

a feedback control circuit including means for sensing the output current and means for multiplying the sensed current by a signal inversely proportional to the operating frequency of the processor.

16. A power supply circuit for a dual mode processor having a relatively constant droop comprising:

a feedback control circuit including means for sensing the output current and means for adjusting initial offset of the output voltage in accordance with the programmed operating voltage of the processor and the operating frequency of the processor.

17. A power supply circuit for a dual mode processor having a relatively constant droop comprising:

a feedback control circuit including means for sensing the output current;

means for centering the power supply droop; and means for keeping constant the power supply droop.

18. A DC/DC converter for supplying power to a multi-mode processor operable in one of at least two modes wherein each mode has an operating voltage, operating current and operating frequency, said converter having an output voltage and an output current and comprising:

an error amplifier having first and second inputs and generating an output error signal for controlling droop of the output voltage and output current of the converter;

the first input comprising a summing input electrically connected to the output voltage and the output current of said DC/DC converter, said summing input configured for adding together signals dependent upon the output voltage and the output current, the second input for receiving a signal dependent upon the operating voltage of the processor, said error amplifier generating an output error signal dependent at least in part upon the output voltage and the output current;

means coupled to one of the inputs to the error amplifier and dependent upon the mode of operation of the processor including the operating voltage, operating current or operating frequency, for adjusting the power supply droop about the median of the operating voltage of the processor to provide symmetrical droop about the operating voltage;

a comparator receiving said error signal, said comparator having a ramp input electrically connected to a voltage ramp signal, said comparator having a comparator output signal, said comparator output signal based at least in part upon said error input; and a power switch having an on condition and an off condition, said power supply configured for supplying dc current to the load when in said on condition, said power switch having a control input electrically connected to said comparator output signal, said power switch being responsive to said comparator output signal to change between said on condition and said off condition to thereby adjust the output current of said DC/DC converter.

19. The DC/DC converter of claim 18 wherein the means coupled to the input of the error amplifier is a multiplier circuit for receiving (a) a signal inversely proportional to the operating frequency of the processor and (b) the output current signal and for generating the first input signal to the error amplifier, wherein said first input signal depends upon the product of the (a) signal inversely proportional to the operating frequency of the processor and (b) the output current signal.

20. The DC/DC converter of claim 19 wherein the multiplier circuit comprises a matrix current decoder including a plurality of current sources of different currents, one input corresponding the output current and connected to all the current sources, another input corresponding the operating voltage of the processor for selecting a current source inversely proportional to the square of the operating voltage, and generating the first input to the error amplifier.

21. The DC/DC converter of claim 18 further comprising a voltage source for offsetting the second input the error amplifier and wherein the means coupled to the input of the error amplifier is a multiplier circuit for receiving (a) a signal inversely proportional to the square of the operating voltage of the processor and (b) the output current signal and for generating the first input signal to the error amplifier, wherein said first input signal depends upon the product of the (a) signal inversely proportional to the operating frequency of the processor and (b) the output current signal.

22. The DC/DC converter of claim 18 wherein the means coupled to one of the inputs to the error amplifier and dependent upon the mode of operation of the processor comprises a buffer amplifier with a variable gain for receiving a signal dependent upon the processor operating voltage and a gain control signal dependent upon the operating frequency of the processor for generating the second input to the error amplifier to offset the droop by both the processor frequency and the processor voltage.

23. The DC/DC converter of claim 18 further comprising a gain control circuit for generating a gain control signal dependent upon the operating voltage of the processor and wherein the means coupled to one of the inputs to the error amplifier and dependent upon the mode of operation of the processor comprises a buffer amplifier with a variable gain for receiving the gain control signal and a signal dependent upon the processor operating voltage.

24. The DC/DC converter of claim 18 wherein the means coupled to one of the inputs to the error amplifier and dependent upon the mode of operation of the processor comprises a buffer amplifier with a variable gain for receiving a first signal dependent upon the processor operating voltage and a gain control signal and a gain control signal generator comprising a voltage matrix decoding circuit having a plurality of voltage reference sources with its output dependent upon the processor voltage for generating said gain control signal.

25. The DC/DC converter of claim 18 wherein the means coupled to one of the inputs to the error amplifier and dependent upon the mode of operation of the processor comprises means for centering power droop about the operating voltage of the processor and keeping the droop constant regardless of operating voltage.

26. The DC/DC converter of claim 18 wherein the means for centering the power droop and keeping it constant comprises centering the voltage comprises a buffer amplifier coupled to the reference input to the error amplifier for offsetting the second input the error amplifier to center the droop and means for multiplying the output current sense signal by a signal inversely proportional to the operating voltage for keeping the droop constant.

27. A DC/DC converter comprising:
an input adapted to be coupled to at least one power source;
an output adapted to be coupled to a load with two or more operation modes; and
a feedback loop adapted to droop an output signal to the load a select amount, wherein the select amount is controlled in part by the operational mode of the load.

28. The DC/DC converter of claim 27, wherein the feedback loop provides relatively equal droop for the different modes of the load.

29. The DC/DC converter of claim 27, wherein the feedback loop further comprises:
a multiplier circuit adapted to multiply a sensed current signal with a signal that is inversely proportional to a frequency of the load.

30. The DC/DC converter of claim 27, wherein the feedback loop further comprises:
a multiplier circuit adapted to multiply a sensed current signal with a signal that is inversely proportional to a reference voltage, wherein the reference voltage is associated with a desired operating voltage of the load.

31. The DC/DC converter of claim 27, wherein the feedback loop further comprises:
a multiplier circuit adapted to multiply a sensed current signal with a signal inversely proportional to a reference voltage and a signal inversely proportional to a frequency in which the load operates, wherein the reference voltage is reflective of a desired operating voltage of the load.

32. The DC/DC converter of claim 27, wherein the feedback loop further comprises:
a multiplier circuit adapted to multiply a sensed current signal with a signal that is inversely proportional to a reference voltage squared, wherein the reference voltage is reflective of a desired operating voltage of the load.

33. The DC/DC converter of claim 27, wherein the feedback loop further comprises:
a buffer amplifier having an input coupled to a reference voltage that is reflective of the desired operating voltage of the load, the gain of the buffer amplifier is adapted to be controlled by a frequency signal having a frequency generally equal to the frequency in which the load operates.

34. The DC/DC converter of claim 33, wherein the frequency signal is adapted to be derived from the reference voltage.

* * * * *